Sept. 11, 1923.
J. H. RIMPLER ET AL
1,467,878
SADDLE COVER
Filed May 18, 1922
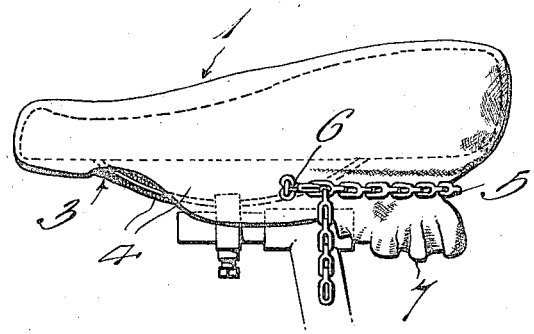
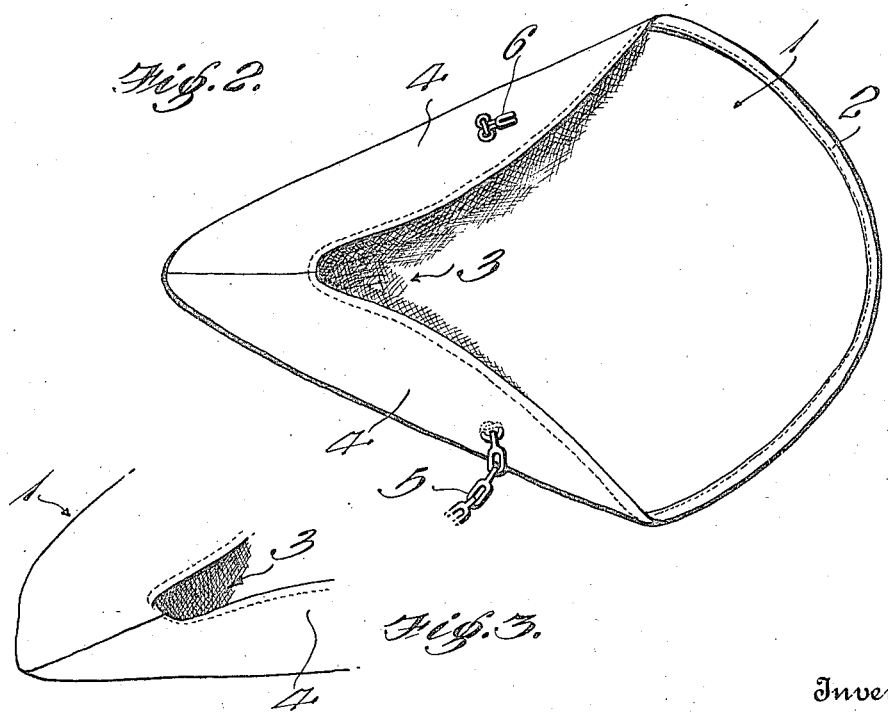
Inventors
JOHN H. RIMPLER
FRANK A. RIMPLER Patented Sept. 11, 1923.

1,467,878

UNITED STATES PATENT OFFICE.

JOHN H. RIMPLER AND FRANK A. RIMPLER, OF GOSHEN, INDIANA.

SADDLE COVER.

Application filed May 18, 1922. Serial No. 561,888.

*To all whom it may concern:*

Be it known that JOHN H. RIMPLER and FRANK A. RIMPLER, citizens of the United States, residing at Goshen, in the county of Elkhart, and State of Indiana, have invented certain new and useful improvements in Saddle Covers; and they do declare the following to be a full, clear, and exact description of the invention, such as will enable others skilled in the art to which it appertains to make and use the same.

This invention relates to an improved saddle cover designed for use either on bicycles or motorcycles it being the principal object of the invention to devise a cover made from suitable water-proof material shaped to effectively fit onto the saddle to protect the latter against the elements of the weather when the saddle is not occupied.

Speaking more specifically, it is another object of the invention to provide a detachable saddle cover which comprises a piece of water-proof material having a pocket formed at its front into which the cantle of the saddle is designed to extend, the piece of material being such in shape that edges thereof can be brought down in the form of flanges around the side edges and pommel of the saddle and drawn by suitable retaining means beneath the latter to maintain it effectively in place to prevent it from being blown off by strong winds, but permitting it to be easily and readily removed when it is desired to use the saddle.

In the acompanying drawings forming a part of this specification and in which like numerals are employed to designate like parts throughout the same:

Figure 1 is a side elevational view of a saddle of this class showing the improved cover in position thereon.

Figure 2 is a bottom plan view of a cover constructed in accordance with this invention.

Figure 3 is a detail perspective view showing the maner of constructing the pocket more clearly.

Specifically described, the improved cover comprises a piece of water-proof material 1, preferably a piece of canvas, the same having its edges reinforced as at 2. At its front, the piece of material has a portion turned inwardly and stitched together to form what may be conveniently termed a pocket 3 into which the cantle of the saddle is designed to extend. Portions of the canvas are turned inwardly toward each other to provide flanges 4 which cover the opposite side edges of the saddle. Any suitable means may be employed for maintaining the cover position, but we preferably use a chain 5 which is riveted or otherwise secured to one of the flanges 4 of the cover, the links of the chain being designed to be selectively connected with a hook 6 which is likewise or otherwise secured to the remaining flange on the opposite side of the cover as shown.

In use, the cover is placed on the saddle so that the horn-like extension or cantel is received in the pocket 3. The flanges 4 then cover the forward portions of the side edges of the saddle and the curved rear edge of the cover is drawn down over the pommel and is drawn inwardly and gathered as indicated at 7, being held in this condition by the chain 5, which has the proper link engaged with the aforesaid hook 6 to cause the cover to be drawn tightly around the saddle.

From the foregoing description it is obvious that we have evolved and devised a unique and extremely simple and inexpensive cover which can be placed upon either a bicycle or motorcycle saddle in a very few seconds so as to effectively protect it against rain, snow or other elements of the weather. Hence, when the bicycle is left standing in the street and the saddle is not occupied, no dust and dirt can deposit thereon nor can the saddle become saturated from rain. The cover is securely held in place by the novel chain and hook and is such in design that it is capable of being placed on practically all conventional types of saddles. There are no straps, buckles, springs or other intricate details existing on this improved invention. The cover can be readily removed when it is desired to occupy the saddle and can be rolled up and placed in ones pocket. Hence, it is extremely compact and easy to handle.

By carefully considering the description in connection with the drawings, persons familiar with devices of this class will doubtless be able to obtain a clear understanding

We claim:—

A saddle cover formed from a piece of fabric cut to form a substantially triangular cover, the latter having a pocket formed at its front end to receive the cantle of the saddle and having depending flanges connected with the pocket, said flanges being adapted to cover the front side portions of the saddle, the rear end portion of the cover being designed to be drawn around and beneath the pommel, a hook secured to the flange on one side of the cover and a chain secured to the flange on the opposite side, the links of the chain adapted to be selectively engaged with the hook to permit effective fitting of the cover on different sized saddles.

In testimony whereof we have hereunto set our hands.

JOHN H. RIMPLER.
FRANK A. RIMPLER.